US006469641B1

(12) United States Patent
Lash et al.

(10) Patent No.: US 6,469,641 B1
(45) Date of Patent: Oct. 22, 2002

(54) MARINE VESSEL MONITORING SYSTEM AND METHOD

(75) Inventors: David M. C. Lash, Toronto (CA); Anthony B. Lash, Toronto (CA)

(73) Assignee: Beacon Marine Security Limited, Toronto (CA)

( * ) Notice: Subject to any disclaimer, the term of this patent is extended or adjusted under 35 U.S.C. 154(b) by 0 days.

(21) Appl. No.: 09/794,655

(22) Filed: Feb. 28, 2001

(51) Int. Cl.$^7$ .............................................. G08B 23/00

(52) U.S. Cl. ........................ 340/984; 340/539; 440/1; 440/2; 114/142; 114/183 R

(58) Field of Search ................................. 340/984, 531, 340/636, 652, 618, 521, 638, 426, 539; 440/1, 2, 113; 114/142, 183 R, 230.27; 417/1, 5, 15, 26, 278, 279

(56) References Cited

U.S. PATENT DOCUMENTS

| | | | |
|---|---|---|---|
| 4,066,545 A | * 1/1978 | Walters et al. ................. 210/71 |
| 4,109,601 A | * 8/1978 | Ronnevig ..................... 114/314 |
| 4,140,996 A | 2/1979 | Leitch et al. ................ 340/521 |
| 4,218,763 A | 8/1980 | Kelley et al. ................ 340/539 |
| 4,341,178 A | 7/1982 | Price ........................ 114/183 R |
| 4,651,139 A | 3/1987 | Oettli ......................... 340/531 |
| 4,651,157 A | * 3/1987 | Gray et al. .................. 342/457 |
| 4,697,535 A | * 10/1987 | Wileman, III ............. 114/183 R |
| 4,705,456 A | 11/1987 | Gardeen ........................ 417/7 |
| 5,078,577 A | * 1/1992 | Heckman ....................... 417/2 |
| 5,225,761 A | 7/1993 | Albright ....................... 320/15 |
| 5,319,698 A | 6/1994 | Glidewell et al. ............. 379/39 |
| 5,448,152 A | 9/1995 | Albright ....................... 320/15 |
| 5,777,551 A | 7/1998 | Hess ........................... 340/541 |
| 5,786,774 A | 7/1998 | Sabol .......................... 340/984 |
| 5,850,180 A | 12/1998 | Hess ........................... 340/541 |
| 5,873,043 A | 2/1999 | Comer ......................... 455/458 |
| 5,889,474 A | 3/1999 | LaDue ........................ 340/825.49 |
| 5,942,988 A | * 8/1999 | Snyder et al. .............. 340/825.69 |
| 6,014,089 A | 1/2000 | Tracy et al. ................ 340/870.02 |

(List continued on next page.)

OTHER PUBLICATIONS

Aqualert, Mar. 24, 2000, www.c-core.ca/whale_c.html.
BoatWatch, Mar. 24, 2000, www.pelagicsystems.com/shop/bwproducts.html.
Flagship Marine, Mar. 22, 2000, www.flagshipsentry.com/security.html.
BoatWatch, Mar. 24, 2000, www.pelagicsystems.com/shop/bwproducts.htm.
MarineSec, Apr. 27, 2000, www.marinesec.com.au/seacurity/sc103.html, www.marinesec.com.au/seacurity/s-hatch.html, www.marinesec.com.au/seacurity/sc104m.html, www.marinesec.com.au/seacurity, www.marinesec.com.au/seacurity/s-highwater.html.
Promarine, Mar. 21, 2000, www.redweb.co.uk/clutterbuck/products/monitor.html.

Primary Examiner—Jeffery Hofsass
Assistant Examiner—Toan Pham
(74) Attorney, Agent, or Firm—Bereskin & Parr

(57) ABSTRACT

The present invention comprises a remote marine monitoring and control system that compiles security information and statistics for on-board equipment on unattended boats, uses a wireless transmitter to send this data to a user over a communications network and allows a user to remotely operate the user's boat in response. Boat operational data can be provided to a user on a variety of personal communication devices and/or through a monitoring web site. These devices can also be used by the user to send a user command to remotely control the operation of the boat. The remote marine monitoring system identifies normal operating conditions for on-board equipment and compares these conditions to current operating activity in order to detect unusual activity. Security information can also be compiled and reported relating to intrusion sensors, keyless entry and the boat's physical location.

21 Claims, 7 Drawing Sheets

U.S. PATENT DOCUMENTS

| | | | |
|---|---|---|---|
| 6,032,036 A | 2/2000 | Maystre et al. | 455/404 |
| 6,049,273 A | 4/2000 | Hess | 340/539 |
| 6,166,627 A * | 12/2000 | Reeley | 340/426 |
| 6,215,407 B1 * | 4/2001 | Winther | 340/632 |
| 6,297,768 B1 | 10/2001 | Allen, Jr. | 342/357.1 |
| 6,338,309 B1 * | 1/2002 | Michelson | 114/183 R |

* cited by examiner

MARINE VESSEL MONITORING SYSTEM AND METHOD

FIELD OF THE INVENTION

The present invention pertains to security systems and in particular to a marine vessel monitoring and control system.

BACKGROUND OF THE INVENTION

Current consumer demand for mobility in lifestyle and vacations has resulted in an increased popularity in boating. However, most of the time, valuable boats are left unattended on moorings or at docks leaving absentee boatowners to worry about the security of their unattended property. Absentee boatowners are also concerned about the vulnerability of their boats to the elements and the malfunctioning of on-board equipment. This has created a substantial need for reliable, effective and affordable boat monitoring systems which provide absentee boatowners with periodic reports on the condition of their unattended boats. Accordingly, a number of marine vessel monitoring systems have been developed.

U.S. Pat. Nos. 5,777,551, 5,850,180 and 6,049,273 to Hess each disclose a boat monitoring system that monitors for instances of unauthorized entry and fire. When a fire is sensed by a smoke detector or unauthorized entry is sensed by intruder sensors, a signal is sent to an on-board microcontroller which sounds a high decibel alarm and which initiates a wireless telephone. However, this monitoring system requires an AC power supply for operation, which is not readily available to unattended boats on moorings and accordingly is not suitable for continuous monitoring of vessels. Also, the monitoring system disclosed by Hess does not allow a boatowner to directly prevent potentially catastrophic damage caused by other types of hazardous boat conditions.

One particularly hazardous boat condition that can give rise to substantial boat damage relates to a boat's bilge pump system. Bilge pump systems are critical to the maintenance of the proper level of the boat within a body of water and include a water pump, a floating device to determine water level and a power source such as a battery. If the fuse is blown or the battery level is low, then a high water level can occur in the bilge causing substantial damage to the operation of the boat. In addition, many bilge pump systems include a bilge pump circuit breaker which can be inadvertently turned off, which can also result in substantial damage to the boat. If bilge pump conditions such as a blown fuse or low battery level can be detected in advance, then hazardous high water levels can be prevented.

U.S. Pat. No. 5,319,698 to Glidewell discloses a marine monitoring system which detects an unauthorized intrusion or a hazardous condition such as a high water level in the boat. When a hazardous condition is sensed, the system places a call to a local security station. However, the system requires the availability of an AC power source which is not available to unattended boats on moorings. Also, the system does not allow for preventative monitoring of a hazardous condition before it becomes critical or otherwise provide the user with the ability to directly intervene and reinstitute bilge pump function.

Accordingly, there is a need for a remote marine vessel monitoring system and method that allows a boatowner to monitor various on-board conditions associated with their unattended boat, which provides a boatowner with the ability to influence the operation of on-board equipment in response to hazardous events, which uses intelligent sensing to predict and avert potentially hazardous conditions.

SUMMARY OF THE INVENTION

The present invention provides a method for remotely monitoring and controlling the operation of a boat over a communication network, said method comprising the steps of:

(a) detecting a warning condition on the boat;
(b) transmitting the warning condition to the user over a communication network;
(c) receiving the warning condition over the communication network and transmitting a user command in response; and
(d) operating the boat according to the user command.

In another aspect, the present invention is a system for monitoring and controlling the operation of a boat, said system comprising:

(a) a communication network;
(b) a detector coupled to the boat for detecting a warning condition;
(c) a first transceiver coupled to the detector and to the communication network for transmitting the warning condition over the communication network;
(d) a second transceiver coupled to the communication network for receiving the warning condition from the first transceiver and for transmitting a user command to the first transceiver; and
(e) a controller coupled to said first transceiver and to the boat for affecting the operation of the boat in accordance with the user command.

Further objects and advantages of the invention will appear from the following description, taken together with the accompanying drawings.

BRIEF DESCRIPTION OF THE FIGURES

For a better understanding of the present invention, and to show more clearly how it may be carried into effect, reference will now be made by way of example to the accompanying drawings in which.

DETAILED DESCRIPTION OF THE PREFERRED EMBODIMENT

Figure 1:
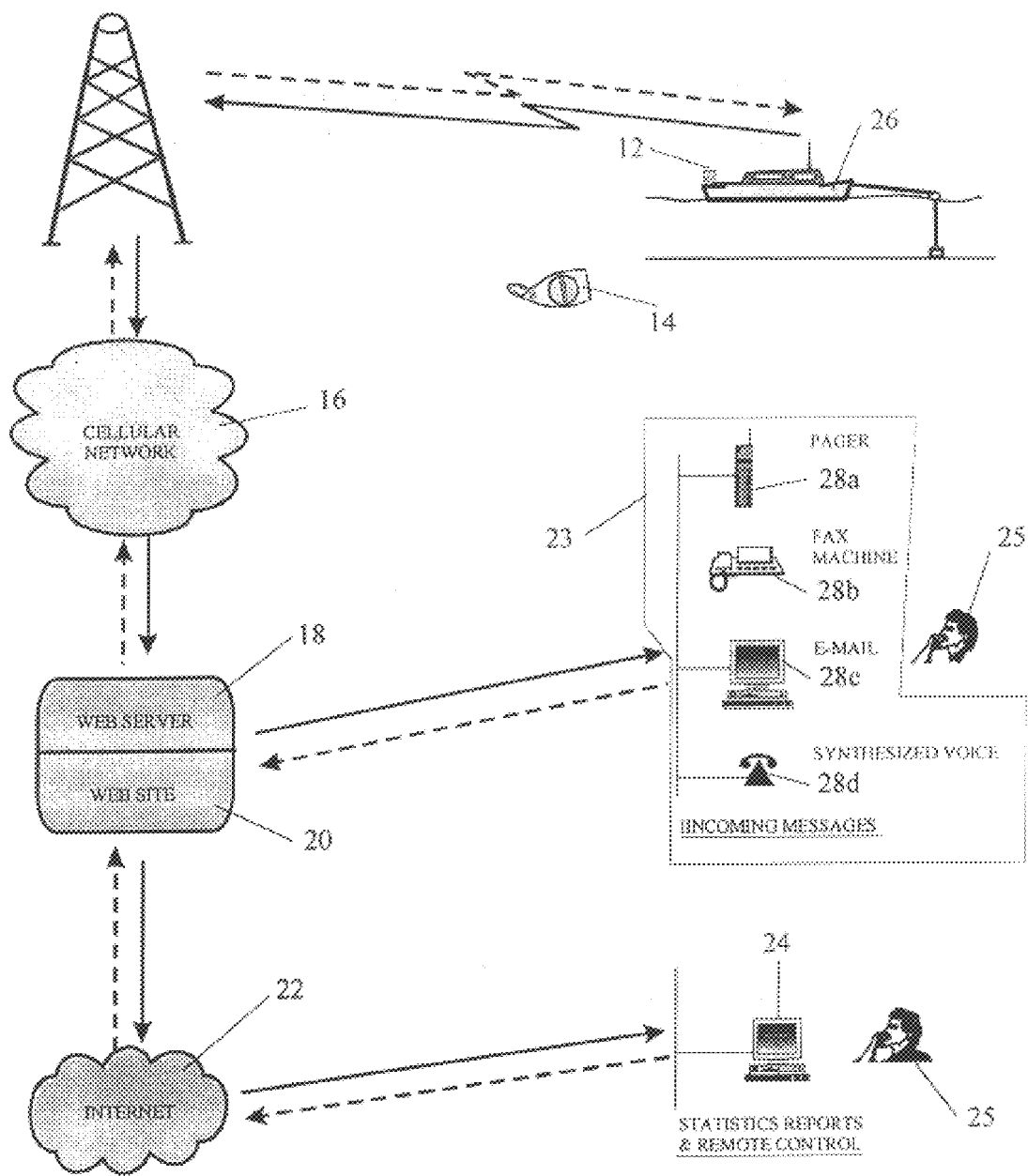
FIG. 1 is a schematic diagram of the preferred embodiment of the remote marine monitoring system.

Reference is first made to FIG. 1, which shows a remote marine vessel monitoring system 10 made in accordance with a preferred embodiment of the present invention. Remote marine monitoring system 10 comprises control unit 12, keytag 14, cellular network 16, web server 18, web site 20, internet 22, personal communication device 23 and web client 24. Remote marine monitoring system 10 can be utilized by boatowner 25 to remotely monitor and control boat 26.

Control unit 12 is mounted on the deck of boat 26 such that the inner electrical parts of control unit 12 are sheltered from the elements as well as from potential vandals. Control unit 12 is powered by its own internal battery pack or by the boat battery. It is preferred for the control unit 12 to only be powered by the boat battery if boatowner 25 is on-board. Control unit 12 is coupled to a number of sensors (not shown), which in turn are mounted on boat 26 in particular areas of interest (e.g. hatches, bilge pump, etc.), as will be further described below. Since control unit 12 does not rely on the boat's primary battery, dangers associated with the draining of the primary battery (i.e. inability to perform critical operations such as bilge pump operation) can be averted.

Keytag 14 is a conventional keytag transmitter which allows boatowner 25 to control the operation of devices from an operating range of approximately 20 to 30 meters (open field). Specifically, keytag 14 allows boatowner 25 to provide activation and deactivation signals to remote marine monitoring system 10 (i.e. to arm or disarm the system as will be described).

Cellular network 16 is used by control unit 12 to contact web server 18 with information about boat 26. In particular, control unit 12 uses the spare capacity of cellular network 16. Web server 18 then notifies boatowner 25 (e.g. by email) that new information about boat 26 is on web site 20 (i.e. as provided by web server 18). Boatowner 25 can then access the system web site hosted by web server 18 and display the web site content within a web browser on web client 24. This communication path is shown by the solid arrows in FIG. 1. It should be understood that while only one web client 24 and boatowner 25 have been shown in FIG. 1, it is contemplated that remote marine monitoring system 10 can include a plurality of web clients 24 and boatowners 25.

It should be understood that while alarm and operation information can be provided to boatowner 25 through his respective web client 24 coupled to the Internet, such information could also be provided to boatowners 25 through a variety of other personal communication devices 23, or combinations therein, as depicted in FIG. 1. Personal communication device 23 can be either a pager 28*a*, facsimile machine 28*b*, telephone 28*c* or cell phone 28*d*. Boatowner 25 can also contact control unit 12 via the Internet 22 (as shown by the reverse dotted path in FIG. 1). Boatowner 25 can use the internet 22 to request information about boat 26 or instruct control unit 12 to take remedial action when information of a possible hazardous situation on boat 26 is shown on web site 20, as will be further described.

Figure 2:
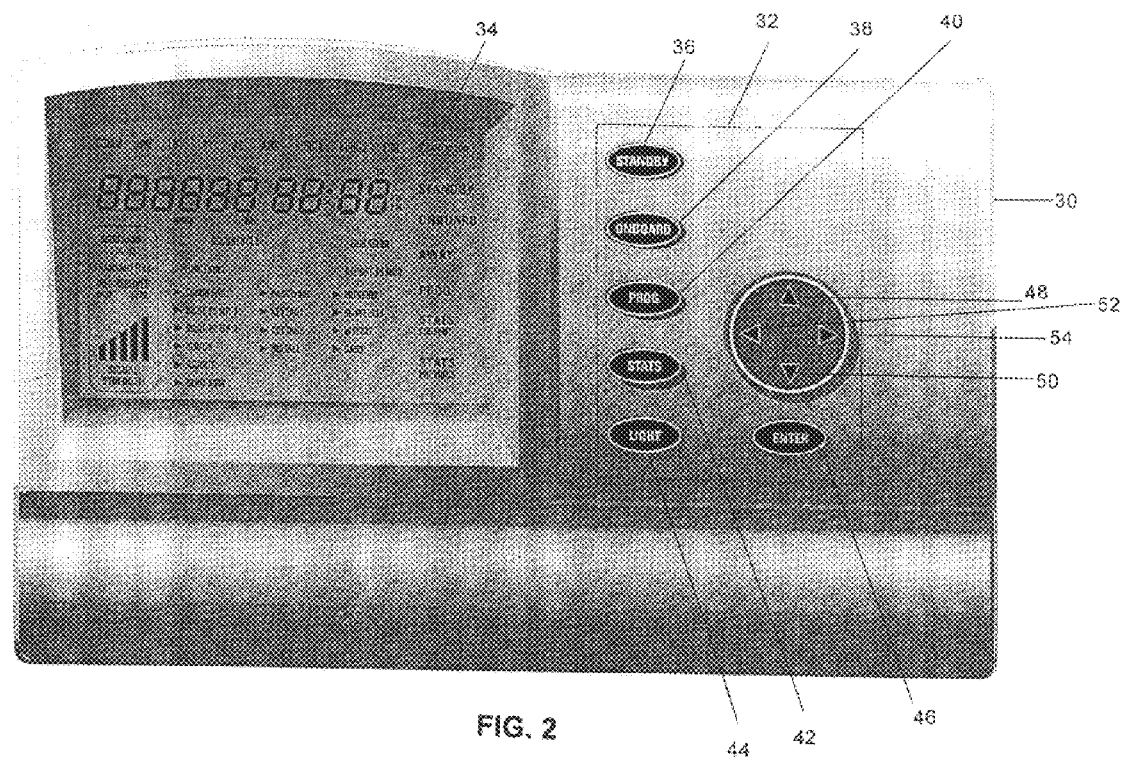
FIG. 2 is a front view of the control unit of the remote marine monitoring system of FIG. 1.

Now referring to FIG. 2, control unit 12 is shown housed within weather resistant enclosure 30 to protect the components of control unit 12. Control unit 12 includes keypad 32 and Liquid Crystal Display (LCD) 34 which together comprise the on-board operator interface to remote marine monitoring system 10. Enclosure 30 is a three-piece custom moulded plastic case containing cutout openings in the front for keypad 32 and LCD 34 and cutout openings in the rear for sensor inputs, outputs, and connectors for an antenna, telephone handset and computer port (not shown).

Keypad 32 is a latex keypad which has six function keys and four scroll keys. In the preferred embodiment of the present invention, the function keys are standby key 36, onboard key 38, prog key 40, stats key 42, light key 44 and enter key 46. The scroll keys are scroll up key 48, scroll down key 50, scroll left key 52 and scroll right key 54. The function keys are used to choose a mode of operation for control unit 12. The scroll keys are used to navigate through available options for the current mode of operation that control unit 12 is in. Enter key 46 is used to select one of the available options and standby key 36 discards any changes that have not been accepted (i.e. enter key 46 was not pressed) and returns to the previous level in the menu. Light key 44 is pressed to illuminate LCD 34 and keypad 32.

LCD 34 is custom manufactured and is covered by a clear water resistant lens. Backlighting for LCD 34 is provided by an electroluminescent panel (not shown) whereas backlighting for keypad 32 is provided by green LEDs (not shown). Both the electroluminescent panel and the green LEDs are normally shut off to conserve power. LCD 34 can display the status of control unit 12, programmable option commands and statistical data.

Figure 3:
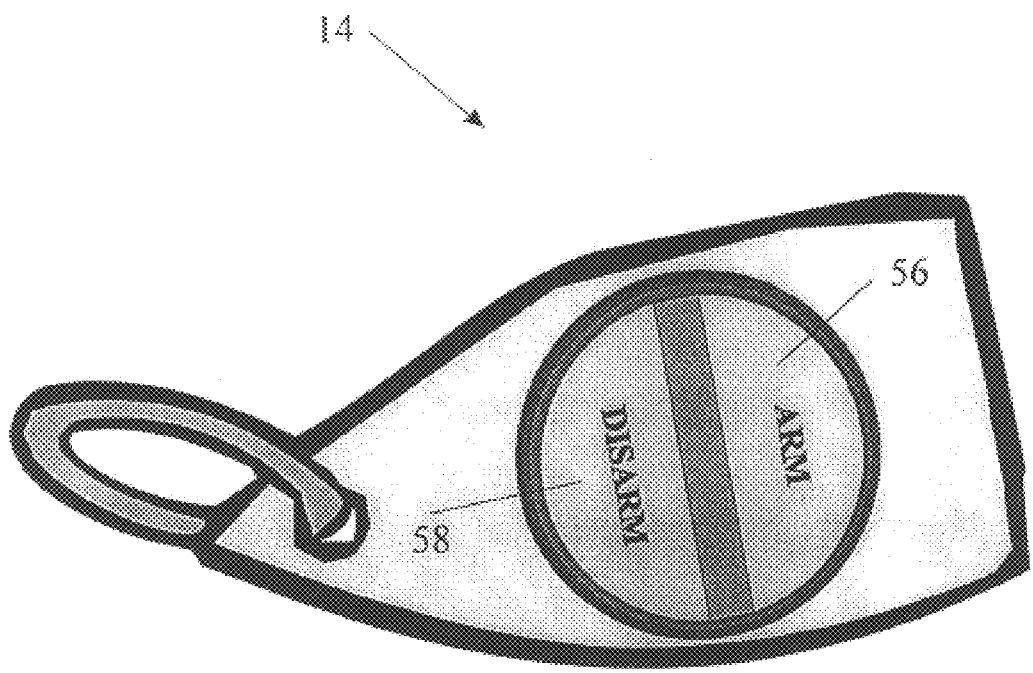
FIG. 3 is a front perspective view of a keytag of the remote marine monitoring system of FIG. 1.

Referring now to FIG. 3, keytag 14 is an off the shelf, water resistant keytag transmitter used to activate and deactivate remote marine monitoring system 10. Keytag transmitter 14 has an arm button 56 and a disarm button 58. Arm button 56 is used to activate remote marine monitoring system 10 and disarm button 58 is used to deactivate remote marine monitoring system 10. There may be more than one keytag transmitter 14 in use with remote marine monitoring system 10 (e.g. various family or crew members could be provided with a keytag 14, each having a unique identifier for tracking purposes as will be described).

Figure 4:
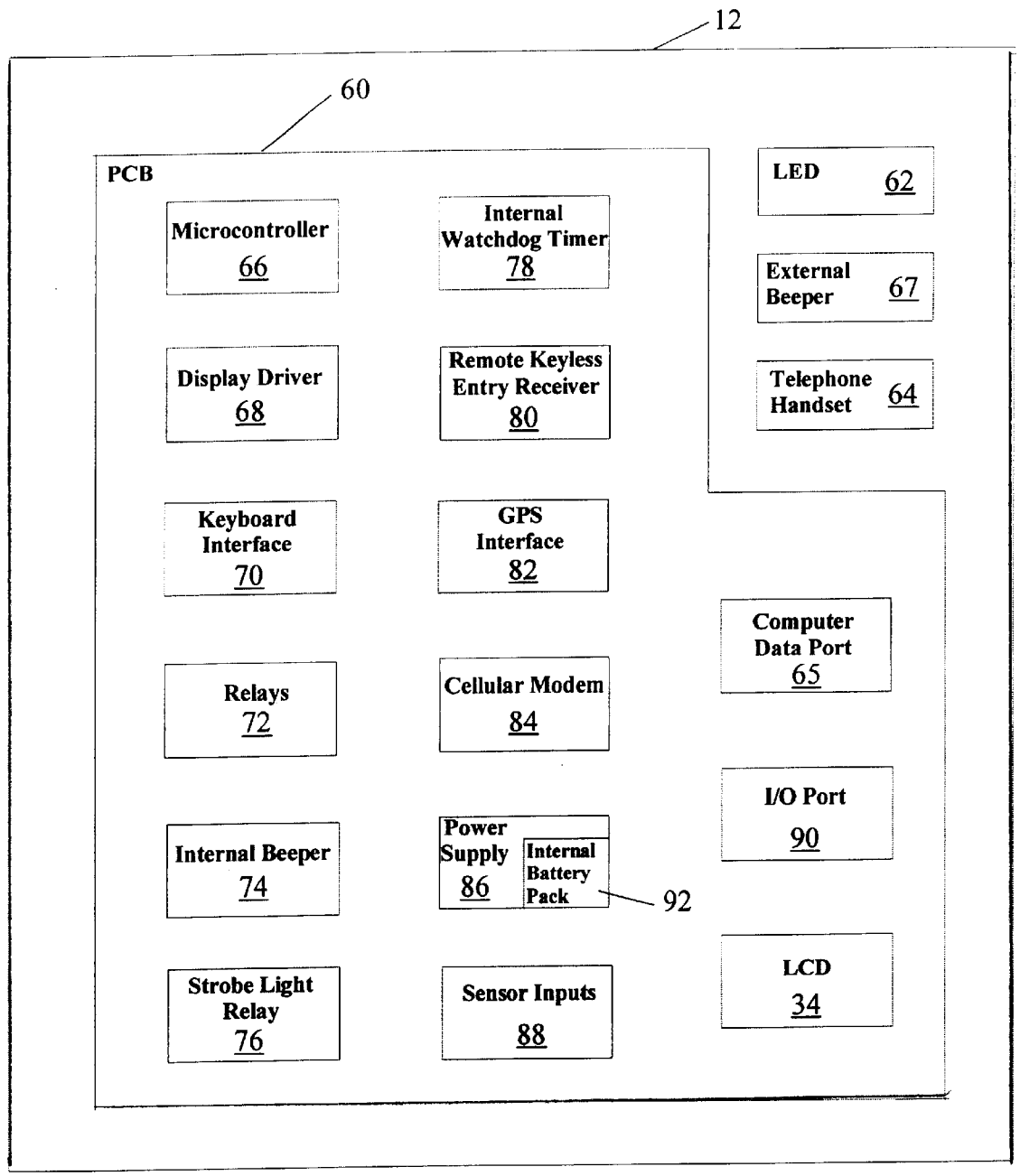
FIG. 4 is a simplified block diagram showing the components of the control unit of FIG. 2.

Referring to FIGS. 1 and 4, the various electronic components of control unit 12 are illustrated in a modular format. It should be understood that while specific connections between the modules are not shown in FIG. 4, interconnections exist between the various components, as needed.

Control unit 12 includes various components on printed circuit board (PCB) 60. The components on PCB 60 include microcontroller 66, display driver 68, keypad interface 70, relays 72, beeper 74, strobe light 76, remote keyless entry receiver 80, GPS interface 82, cellular modem 84, power supply 86, sensor inputs 88, I/O port 90 and LCD 34. These components are shut down or placed in standby mode when not in use to conserve power. PCB 60 has connectors for a telephone handset 64, a computer port 65, cellular modem 84, power supply 86 and I/O port 90. External LED 62 and external beeper 67 provide visual and audible confirmation that control unit 12 is armed or disarmed.

PCB 60 and the aforementioned components are conformal coated allowing them to withstand the effects of rigors of a harsh marine environment such as salt water, condensation and humidity. Control unit 12 is also generally designed to withstand vibration and electrical noise.

Microcontroller 66 is preferably an Atmel ATmega103 with 128 KB of flash memory, 4 KB of SRAM and 4 KB of EEPROM. Microcontroller 66 has a maximum clock rate of 6 MHz and can be placed in low power sleep mode to conserve power. It should be understood that any other microcontroller may be utilized as long as it has sufficient memory and operational speed. To conserve power, microcontroller 66 is programmed to power up at regular intervals (e.g. every 125 milliseconds) to check the status of the sensors of remote marine monitoring system 10.

Display driver 68 is preferably an OKI MSM9004-04 1/4 duty LCD driver with four common drivers and 50 segment drivers, although any commercially available display driver with the requisite drive capabilities may be used. Display driver 68 is automatically disabled after one minute if no keys on keypad 32 have been pressed. Integrated keypad interface 70 connects each key on keypad 32 to a separate input/output pin of microcontroller 66.

Relays 72 are used in two ways. First, relays 72 can be used to turn a specific boat object on. For instance, relays 72 can be used to turn on strobe light 76. Secondly, relays 72 can be used by remote marine monitoring system 10 to sense if an object is turned on.

External beeper 67 and internal beeper 74 provide an audible indication of an alarm condition or the arming or disarming of remote marine monitoring system 10. Strobe light 76 and external LED 62 provide a visual indication of an alarm condition or the arming or disarming of marine monitoring system 10. Internal watchdog timer 78 provides power-on reset and brown out protection and a threshold detector for monitoring internal battery pack 92 in control unit 12.

Remote keyless entry receiver 80 is based on the Microchip HCS500 Code Hopping Decoder and is connected to microcontroller 66 by a serial interface (not shown). Remote keyless entry receiver 80 interacts with a remote keyless entry transmitter, based on the Microchip HCS200 Code Hopping Encoder, in keytag 14. Alternatively, different decoders and encoders, that can interface with each other, may be used in the remote keyless entry receivers and transmitters.

GPS interface 82 can interface with any commercially available GPS unit which complies with the NMEA standards. For example, control unit 12 can interface with GPS units manufactured by various GPS manufacturers including Garmin International of Kansas, Furuno Electrical Co. Ltd. of Japan, Raytheon Company of Massachusetts and Magellan Corporation of Californis. Control unit 12 is designed to request any information that is supported by a GPS network. Example information includes the latitude and longitude of boat 26, the time of the position fix and the status of the positioning system while generating the position data. This information is routinely broadcast by a central GPS network, however, boatowner 25 can also interrogate the central GPS network for information.

Cellular modem 84 can be any commercially available cellular modem such as the CMM8600 model manufactured by Standard Communications Corporation. Cellular modem 84 is connected to PCB 60 (by a connector) and to an antenna (not shown). Microcontroller 66 communicates with cellular modem 84 via an asynchronous serial interface. To conserve power, cellular modem 84 is usually shut down or placed in sleep mode.

To send a message, microcontroller 66 must wait for cellular modem 84 to acknowledge that it is ready. If cellular modem 84 doesn't respond within three seconds, microcontroller 66 initializes cellular modem 84 and then attempts to send a message on the control channel of cellular network 16 by using the last known SID, from the HarborMaster's internal SID table that contains the most recent ten entries. If this is not successful, the microcontroller searches Channel A and if necessary Channel B for a new Tower SID which is added to the SID table. If microcontroller 66 was successful in sending a message on Channel A or B of cellular modem 84. Otherwise, microcontroller 66 attempts to communicate on channel B of cellular modem 84. If microcontroller 66 was successful in sending a message on Channel A or B of cellular modem 84, it waits for an acknowledgement, asks for the signal strength of the transmitted message and then shuts down cellular modem 84. If microcontroller 66 was not successful in sending the message it tries again every two minutes up to a maximum of five times after which microcontroller 66 signals a communication failure alarm. If communication fails while there is an alarm condition on boat 26, then strobe light 76 is turned on and remains on until someone has investigated the condition which caused the alarm to occur or until control unit 12 runs out of power.

Cellular modem 84 extends the data link capabilities of control unit 12 since control unit 12 can be adapted to interface with a telephone or cell phone through cellular modem 84. In particular, control unit 12 can be used as a voice and data communications link for boat 26. In addition, higher capacity cellular modems 84 for third generation (3G) cellular networks could be used to increase the speed of data transmission and the information bandwidth to and from boat 26. Thus, control unit 12 can be used by people on-board boat 26 for sending and receiving data and for voice communications.

Power supply 86 provides power to control unit 12 via internal battery pack 92 which consists of six replaceable C-cell batteries. If there is insufficient power in internal battery pack 92 or boatowner 25 wants to conserve the power in internal battery pack 92, then control unit 12 can be powered by the primary battery of boat 26. Internal battery pack 92 is connected to PCB 60 by two 20 gauge stranded wires (not shown). Power supply 86 is designed to provide a five volt supply for microcontroller 66, another five volt supply for any peripheral components attached to control unit 12 and a 12 volt supply for cellular modem 84. Microcontroller 66 monitors the voltage of power supply 86 and signals an alarm when the voltage of power supply 86 drops below a predetermined voltage.

By using internal battery pack 92, the present invention can provide monitoring and security to boat 26 while ensuring that the primary battery of boat 26 is available for critical operations. Efficient hardware, software, communication technology and internal battery pack 92 enables the present invention to effectively and continuously monitor boat 26 for up to 12 months at normal operation (i.e. one status report per month) before the six C-cell batteries need to be replaced.

In the preferred embodiment of the present invention, sensor inputs 88 comprise the following inputs: high water (HW), low internal battery (IB), low boat battery 1 (LB1), low boat battery 2 (LB2), AC shore power (AC), auxiliary (AUX), bilge pump 1 (BP1), bilge pump 2 (BP2), ignition (IGN), burglar alarm 1 (BURG1), burglar alarm 2 (BURG2) and fire (FIRE). All sensor inputs 88, except IB, LB1 and LB2 are assumed to be normally closed dry contacts. Burglar alarm 1 preferably corresponds to a sensor placed at the main hatch while burglar alarm 2 is preferably placed at a another hatch. Alternatively, other locations may be used for burglar alarm 1 and burglar alarm 2. The AUX sensor input can be a dry, closed contact or can be used to monitor an additional battery input or another object. All inputs are protected by transient voltage suppressors, ferrite beads and low pass filters. All inputs are connected to control unit 12 by screw terminals on PCB 60.

Alarm conditions are defined within remote marine monitoring system 10 as indicated within the table below. Although the table shows alarms (LB1 and LB2) for two boat batteries, remote marine monitoring system 10 can be used with a boat 26 that has three boat batteries by hooking up the AUX sensor to the third battery. Values other than those shown in the table below may be used to signal an alarm condition and it should be understood that the values shown in the table below are for illustrative purposes only.

| ALARM TYPE | ALARM CONDITION |
|---|---|
| AC alarm | AC shore power is lost for at least 12 cumulative hours in any 24 hour period |
| IB alarm | the voltage on internal battery pack 92 drops below 6 volts |
| LB1 alarm condition exists | boat battery 1 is a 12 (24) volt battery and the voltage on boat battery 1 becomes less than 11.7 (23.4) volts |
| LB2 alarm condition exists | boat battery 2 is a 12 (24) volt battery and the voltage on boat battery 2 becomes less than 11.7 (23.4) volts |
| AUX alarm | an "extra" alarm condition which is user selectable |
| HW alarm | the bilge water exceeds a predetermined high water level |
| Burg1 | unauthorized entry through object monitored by burglar alarm 1 |
| Burg2 | unauthorized entry through object monitored by burglar alarm 2 |
| fire | possible fire on-board boat |
| BP1 | unusual activity for bilge pump 1 |
| BP2 | unusual activity for bilge pump 2 |

I/O port 90 is comprised of I/O port A and I/O port B. I/O port A has six 8-bit ports labelled HW, BP1, BP2, LB1, LB2, IGN, AC and AUX. I/O port B has ports labelled SCK, MOSI, MISO, load, data, clock2 and two unused ports.

Figure 5:
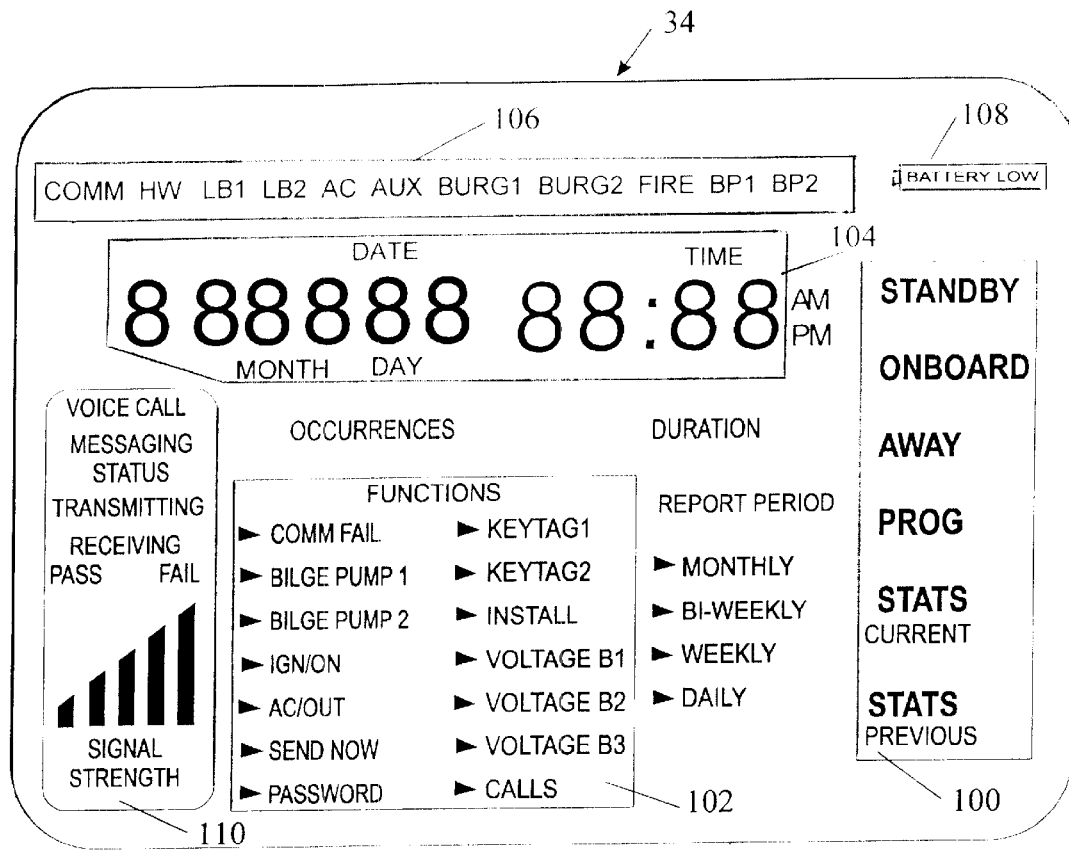
FIG. 5 is a front view showing all information which can be displayed on the LCD of control unit of FIG. 2.

FIG. 5 shows LCD 34 as it would appear if all segments on LCD 34 were displayed. As is conventionally understood, in normal operation, only information relevant to the current mode of operation would be displayed on LCD 34. LCD 34, mounted directly on PCB 60, is turned on only when light key 44 is pressed after which LCD 34 automatically turns off after 30 seconds to conserve power.

Referring now to FIG. 5, the five modes of operation for control unit 12, shown in mode field 100, are STANDBY, ONBOARD, AWAY, PROGRAM (i.e. PROG) and STATISTICS (i.e. STATS). STATISTICS mode is comprised of statistics for the current time period (STATS CURRENT) and statistics for the previous time period (STATS PREVIOUS). The fourteen functions available on control unit 12, shown in functions field 102, are COMM FAIL, BILGE PUMP 1, BILGE PUMP 2, IGN/ON, AC/OUT, SEND NOW, PASSWORD, KEYTAG1, KEYTAG2, INSTALL, VOLTAGE B1, VOLTAGE B2, VOLTAGE B3 and CALLS. CALLS contains statistics about the number of incoming calls (i.e. data transferred from web site 20 to control unit 12) and the number of outgoing calls (i.e. data transferred to web site 20 from control unit 12). This is useful for boatowner 25 in verifying the number of transmissions that were sent or received by control unit 12. SEND NOW is used by someone on-board boat 26 to send statistics to web site 20.

Statistical data, time and date information is displayed in number field 104. Alarm data is shown in alarm field 106 across the top of LCD 34. The alarms are COMM, HW, LB1, LB2, AC, AUX, BURG1, BURG2, FIRE, BP1 and BP2. When internal battery pack 92 is running low, battery low symbol 108 appears in the upper right hand corner of LCD 34. The status of message transmission is shown in message field 110 at the left hand side of LCD 34. Message field 110 can show that a message is being sent (TRANSMITTING is displayed) or received (RECEIVING is displayed) and whether transmission or reception was successful (PASS or FAIL is displayed). VOICE CALL is displayed when someone on-board boat 26 is placing or receiving a telephone or cell phone call. VOICE CALL is also displayed when someone on-board boat 26 is sending or receiving broadband data such as internet data. The strength of signal transmission, for all of these data types, is shown in bar graph form in the bottom half of message field 110. In normal operation, the signal strength may be shown by simultaneously pressing and holding onboard key 38 and enter key 46.

Control unit 12 can send seven different types of messages to boatowner 25. The messages are "statistics_part_1", "statistics_part_2", "statistics_part_3", "alarm", "position_latitude/longitude", "password" and "test". All messages are 15 digits long. The first digit of each message indicates the type of message (e.g. a one indicates a statistics_part1 message). Not all digits are used in each message type and unused digits in each message are set to zero. Statistics messages are sent monthly, biweekly, weekly or daily and include both the current reporting date and the next reporting date. The data in the statistics messages are collected for the current time period only. The statistics are cleared from Current statistics and stored in Previous statistics if the message has been sent correctly, otherwise, the statistics are kept until the next successful transmission.

Statistics will be sent regardless of what mode control unit 12 is in. When a statistics message is sent, if the GPS has been activated and is responding, the position_latitude/longitude message will also be sent. Alarm messages are only sent if an alarm occurs while control unit 12 is in AWAY mode or if a low internal battery alarm (IB) occurs in any mode. If the alarm condition is a BURG1 or BURG2 alarm and the GPS receiver is responding, then the alarm, position_latitude and position_longitude messages will be sent every 15 minutes until the alarm condition is rectified.

The statistics_part_1 message includes the number of times BP1 was activated, the number of hours BP1 was active, the number of times BP2 was activated, the number of hours BP2 was active, the number of times AC shore power was lost and the number of hours of AC shore power loss. AC shore power loss is important for boats with trickle chargers, freezers, etc.

The statistics_part_2 message includes the number of times the ignition was activated, the number of hours the engine was active, the number of communication failures, the number of times keytag1 was used, the number of times keytag2 was used, the number of times the password was used and the number of days since the last statistics message transmission. The ignition and the number of hours that the engine was active is important for monitoring the completion of scheduled maintenance and/or for monitoring unauthorized use. A log of password usage provides a record of system changes. A log of the usage of each keytag provides a record of who entered boat 26 and when this entry occurred.

The statistics_part_3 message includes the five day moving average of BP1 "on time" duration, the five day moving average of BP2 "on time" duration, the current voltage level of the primary battery, the current voltage of the secondary battery and the current voltage of a third battery. This assumes that there are three batteries on-board boat 26, otherwise the voltage values corresponding to batteries that are not on-board boat 26 will be zero.

The alarm message consists of 0's and 1's for each alarm condition being monitored whereby a 0 represents a normal state of operation and a 1 represents an alarm state. The following alarm conditions are represented in the alarm message: high water level in the bilge (HW), low voltage on battery 1 (LB1), low voltage on battery 2 (LB2), loss of AC shore power (AC), a first burglar alarm (BURG1), a second burglar alarm (BURG2), an auxiliary condition (AUX), fire, low voltage on internal battery pack 92 (1B), bilge pump 1 unusual activity and bilge pump 2 unusual activity. The alarm message also contains a signal strength value which is a three digit number representing the signal strength used when control unit 12 is trying to access cellular network 16. The signal strength value is used as a diagnostic tool so that boatowner 25 can determine if a larger antenna is needed for control unit 12.

The position_latitude/longitude message includes a latitude value (six digits long) and a North or South designation (a 0 for North or a 1 for South) and a longitude value (seven digits long). The test message, resembling the alarm message in structure, is transmitted when PROG key 40 and STATS key 42 are pressed simultaneously while control unit 12 is in PROGRAM mode.

The password message includes five digits (i.e. a five digit password) whereby each digit is encrypted. The password message also contains the number of incoming calls received (i.e. data transferred from web site 20 to control unit 12) and the number of outgoing calls sent (i.e. data transferred to web site 20 from control unit 12) during the current reporting period. The password message further contains signal strength information as described previously for the alarm message.

The five modes of operation for control unit 12 are STANDBY, ONBOARD, PROGRAM, STATISTICS and AWAY. In any mode, when an alarm condition occurs, the corresponding sensor will blink in alarm field 106 on LCD 34 and beeper 74 will sound. Pressing enter key 46 on keypad 32 will silence beeper 74 and stop the blinking in alarm field 106, however, the alarm condition will remain displayed in alarm field 106 until the alarm condition has been attended to. In every mode, the sensors are monitored every 125 milliseconds.

STANDBY mode is the default mode of operation for control unit 12. Control unit 12 will revert back to STANDBY mode from STATISTICS or PROGRAM mode after one minute if no keys on keypad 32 are pressed. From STANDBY mode, control unit 12 can be put into ONBOARD, STATISTICS or PROGRAM mode by pressing the appropriate key on keypad 32. In STANDBY mode, control unit 12 can be put into AWAY mode by activating keytag 14. In STANDBY mode, control unit 12 monitors all sensors but only activates beeper 74 for an alarm related to boat safety (i.e. any alarm other than BURG1 or BURG2).

ONBOARD mode can only be entered by pressing on-board key 38 while control unit 12 is in STANDBY mode. During ONBOARD mode, control unit 12 monitors all sensors.

PROGRAM mode can only be entered by pressing prog key 40 on keypad 32 while control unit 12 is in STANDBY mode. After pressing prog key 40, the operator will be prompted to enter a password, which if entered correctly, will cause control unit 12 to enter PROGRAM mode. In PROGRAM mode, control unit 12 monitors all sensors but only activates beeper 74 for an alarm related to boat safety (i.e. an alarm condition other than BURG1 or BURG2).

PROGRAM mode is used to set the statistics reporting period (monthly, bi-weekly, weekly or daily), to set the date and time, to change the password (which is preferably five characters long), to enter keytags and to configure sensor inputs during installation. In the preferred embodiment, remote marine monitoring system 10 can accept two keytags, keytag1 or keytag2, as shown in functions field 102 on LCD 34. Pressing and holding prog key 40 and enter key 46 simultaneously will reprogram control unit 12 to monitor only those sensors that have been installed.

STATISTICS mode can be entered by pressing stats key 42 while in STANDBY mode. In STATISTICS mode, control unit 12 will monitor all sensors but will only activate beeper 74 in response to any alarm other than BURG1 or BURG2. STATISTICS mode displays information related to communication failures, bilge pumps (BP1 and BP2), AC shore power outages and ignition. Control unit 12 also maintains a log of the date and time when the password and keytags were used. The only mode accessible from STATISTICS mode is STANDBY mode which is accessed by pressing standby key 36. Statistics may be viewed for the current time period or the previous time period.

To arm remote marine monitoring system 10, boatowner 25 activates AWAY mode by pressing arm button 56 on keytag 14. When remote marine monitoring system 10 is armed, strobe light 76 and LED 62 flash twice and beeper 74 will beep twice. While remote marine monitoring system 10 is armed, LED 62 flashes every three seconds. When remote marine monitoring system 10 is disarmed, strobe light 76 flashes once, LED 62 flashes once and beeper 74 will beep once.

In AWAY mode, any prior alarm conditions will be indicated on LCD 34 but ignored. The one exception is BURG1 in which case the main hatch must be closed before entering AWAY mode (this assumes that the sensor corresponding to BURG1 is placed at the main hatch). In AWAY mode, control unit 12 monitors all sensors. If an alarm condition occurs then beeper 74 will not be activated and an alarm condition will not be displayed in alarm field 106, however, an alarm message will be sent to boatowner 25 to indicate the alarm condition. If the alarm condition is BURG1 or BURG2 and the GPS receiver is responding then the alarm message will also include the position of boat 26. The alarm message will be sent every 15 minutes until the alarm condition has been cleared. Control unit 12 can only be returned to STANDBY mode by pressing disarm button 58 on keytag 14 or by entering password (a safety feature in the case of a lost or inoperative keytag).

A major advantage of remote marine monitoring system 10 is the ability to view statistics about boat 26 on web site 20 or alternatively through personal communication device 23 at any time from any location in the world. Another major advantage is that boatowner 25 can use the Internet 22 to remotely activate specified on-board equipment or perform operations on boat 26 such as switching power from a primary battery to a secondary battery, activating a bilge pump or switching on the GPS receiver. In addition, boatowner 25 can remotely change operational modes on control unit 12, set variable parameters and alter reporting periods. This allows boatowner 25 to monitor boat 26 from anywhere in the world without having to subscribe to a third-party monitoring service or hire someone to check boat 26 periodically.

To facilitate remote monitoring and command execution, web site 20 consists of reverse channel software and forward channel software. The terms "forward channel" and "reverse channel" correspond to the forward path (dotted line) and reverse path (solid line) shown in FIG. 1. The reverse channel software can receive status reports from control unit 12. It then loads this data into a database and logs all data to a backup file. The forward channel software can send control and configuration data to control unit 12. Both the reverse channel software and forward channel software will ping control unit 12 on a periodic basis to verify connection and automatically attempt to reconnect if necessary. Web site 20 also supports delayed or time scheduled pages. Referring to FIG. 1, web site 20 notifies boatowner 25 when new data about boat 26 is available via email, pager, facsimile, telephone or cell phone. In the case of the telephone or cell phone, a text-to-speech conversion program is used.

Another advantage of remote marine monitoring system 10 is that it utilizes artificial intelligence to determine normal levels of activity and thus determine the degree of variation of current activity from normal levels for various equipment on-board boat 26. If the current activity is found to be abnormal then remote marine monitoring system 10 will take appropriate action such as sending an alarm and/or a statistics message to boatowner 25 or simply continuing to monitor the situation. This artificial intelligence methodology provides boatowner 25 with an early warning of potential problems on boat 26 before an emergency arises which could lead to the sinking of boat 26.

Figure 6:
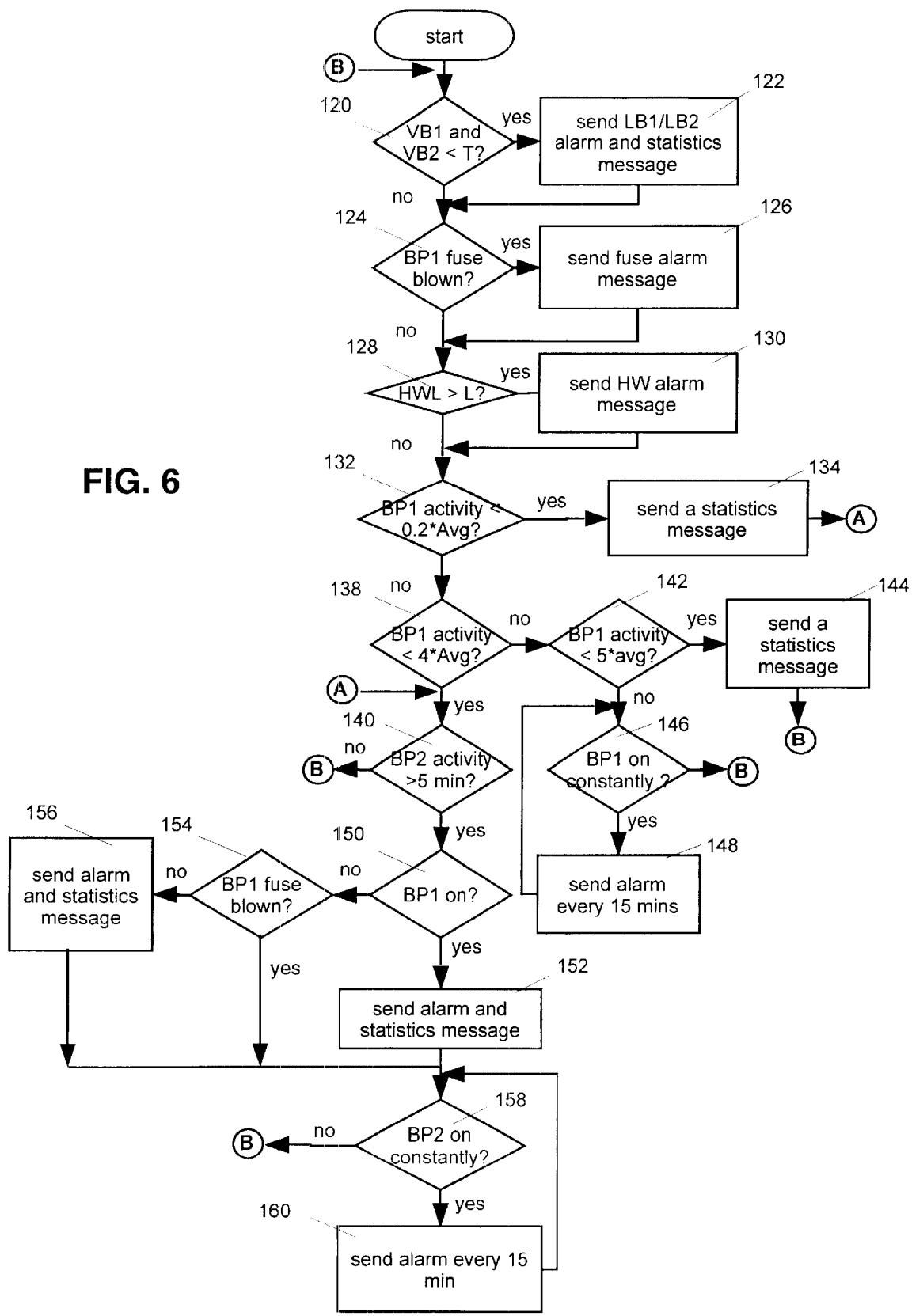
FIG. 6 is a flowchart showing the bilge system monitoring sequence for the remote marine monitoring system of FIG. 1.

One example of intelligent monitoring is shown in FIG. 6 which illustrates the process undertaken by remote marine monitoring system 10 for monitoring the bilge system of boat 26. In the preferred embodiment, every 125 ms, control unit 12 will monitor the voltage level of the primary battery (VB1), the voltage level of the secondary battery (VB2), the integrity of the bilge pump fuse (alternatively there may be a bilge pump circuit breaker), the activity of bilge pump 1 (BP1), the activity of bilge pump 2 (BP2) and the water level (HWL) in the bilge. No other current monitoring system measures the voltage levels of the boat batteries or the integrity of the bilge pump fuse (or bilge pump circuit breaker).

In the preferred embodiment, the bilge pump activity monitored is the duration of time that each bilge pump is active and the number of times the bilge pump turns on. Alternatively the water flow rate through the bilge pump could also be monitored. Bilge pump activity is obtained by calculating a moving average over a preset number of days to determine what is normal bilge pump activity for boat 26. Preferably, the learning cycle is a period of five days. This time period allows for accurate assessments of normal bilge pump operation during both the dry and rainy seasons.

Remote marine monitoring system 10 uses robust measurements to monitor the bilge pump system of boat 26. For instance, to get an accurate measurement of bilge water level, compensation for sloshing water in rough seas is made. This compensation involves determining whether the measured water level is at a sustained level or whether it is transient (i.e. the water is sloshing because of rough seas). Furthermore, when voltage levels on batteries are measured, a distinction is made between engine start-up drain (which is transient) and sustained drain which is a more serious problem.

As shown in FIG. 6, remote marine monitoring system 10 begins to monitor the bilge pump system of boat 26 at step 120 where VB1 and VB2 are compared to a threshold T. Threshold T is preferably equal to 11.7 volts if the primary and secondary batteries are 12 volt batteries or 23.7 volts if the primary and secondary batteries are 24 volt batteries. If either VB1 or VB2 is below threshold T then the process moves to step 122 where an LB1/LB2 alarm message along with a statistics message is sent to boatowner 25. Next, at step 124, the fuse of BP1 is checked to make sure it is not blown (alternatively, for some bilge pump systems, a bilge pump circuit breaker may be checked to verify that it is not tripped). If the fuse of BP1 is blown then at step 126 a fuse alarm message is sent to boatowner 25. Next at step 128, the water level in the bilge is checked to see if it is above a threshold L (i.e. a high water level has been detected). If the high water level threshold (L) is exceeded then at step 130 an HW alarm message is sent to boatowner 25.

Next, BP1 activity is tested in step 132. If BP1 activity is less than 0.2 times normal BP1 activity then this situation indicates that BP1 may be malfunctioning in which case at step 134 a statistics message is sent to boatowner 25 after which the process flows back to step 120. Otherwise the next step is to check if BP1 activity is lower than four times normal BP1 activity. If this is true, then BP2 activity is checked in step 140. However, if BP1 activity is higher than four times normal BP1 activity, then the process moves to step 142 to determine whether BP1 activity is lower than five times normal BP1 activity. If this is true then the process flows to step 144 where control unit 12 sends a statistics message to boatowner 25. The process then returns to step 120. Alternatively, if BP1 activity is greater than five times normal BP1 activity then the process flows to step 146 where BP1 is checked to see if it is pumping continuously. If this is true then in step 148, control unit 12 sends an alarm message to boatowner 25 every 15 minutes and continues to monitor BP1 to see if it is pumping constantly. Otherwise if BP1 is not pumping constantly the process moves to step 120.

In step 140, if BP2 has not been active for more than five minutes then the process returns to step 120. However, if BP2 has been active for more than five minutes then the process flows to step 150 where BP1 is checked to see if it is on. If BP1 is on then an alarm and statistics message is sent to boatowner 25 at step 152, however, if BP1 is not on then the process flows to step 154 where the fuse of BP1 is checked to see if it is blown. If the fuse of BP1 is not blown then the process flows to step 156 where an alarm and statistics message is sent to boatowner 25. Next, at step 158, BP2 is checked to see if it pumps constantly. If BP2 pumps constantly then an alarm message is sent to boatowner 25 every 15 minutes and control unit 12 continues to monitor BP2. If BP2 is not pumping constantly then the process moves to step 120.

In the above process, when boatowner 25 receives notification of unusual activity, boatowner 25 can diagnose the situation remotely. For instance, if BP1 is on too long or all the time and BP2 activity is unusual then there can be a serious problem such as a broken impeller, faulty motor, plugged intake, a weakening battery or most commonly a leak. Alternatively, if BP1 is not on at all for an extended period of time and if BP2 activity is unusual then it is a more serious problem such as a broken wire, a faulty float switch or a burned motor. In this case, boatowner 25 could try to remotely start BP1 thus bypassing the automatic float switch and circuitry. If BP1 could not be started then boatowner 25 would send in a repair person. If the problem is a low battery, then boatowner 25 could turn on a generator to recharge the battery or switch to another battery to power the bilge systems of boat 26. Thus, boatowner 25 can perform appropriate remedial actions remotely via web site 20 or dispatch maintenance personnel to boat 26.

Remote marine monitoring system 10 is also unique in terms of the security information which it provides. This security information includes intrusion sensor data, GPS information and keyless entry data. This is important since monitoring a boat is different than monitoring a home in that a boat's location is not fixed. The present invention addresses this issue by using wireless mobile communication and GPS technology to transmit alarm information to web server 18 as long as boat 26 is near a marina or harbour which has cellular service. The present invention can do this since most boats today have a GPS unit. Remote marine monitoring system 10 also allows boatowner 25 to turn on the GPS unit remotely at any time and ask for GPS information or program a set time at which control unit 12 can determine where it is, perform a self-check and send statistics.

In effect, the present invention uses GPS and intrusion sensor data to set up an "electronic fence" that boatowner 25 can monitor for indications of boat adrift and intrusion events. For instance, if the BURG1 or BURG2 alarm condition occurs and GPS interface 82 has been activated and is responding then an alarm message can be sent to boatowner 25 which includes position information for boat 26. This alarm message will be sent every 15 minutes until the alarm condition has been taken care of. Furthermore, if boat 26 has been stolen and is being driven by an unauthorized person then boatowner 25 can use web site 20 and cellular network 16 to disable the engine of boat 26. Likewise, the engine of boat 26 may also be remotely enabled if so desired. This is very straightforward to implement by someone who is skilled in the art. The present invention can also use the GPS and 9-1-1 locating systems for a panic button for onboard personnel.

As previously mentioned, remote marine monitoring system 10 also utilizes an electronic keyless entry system to arm and disarm the system. The identity, date and time of each keyless entry is recorded to provide a record of who enters the boat and when this entry occurs. Furthermore, the number of times the programming password was used is also recorded. This information is useful in determining if anyone has tampered with remote marine monitoring system 10, or is using boat 26 without permission.

Figure 7:
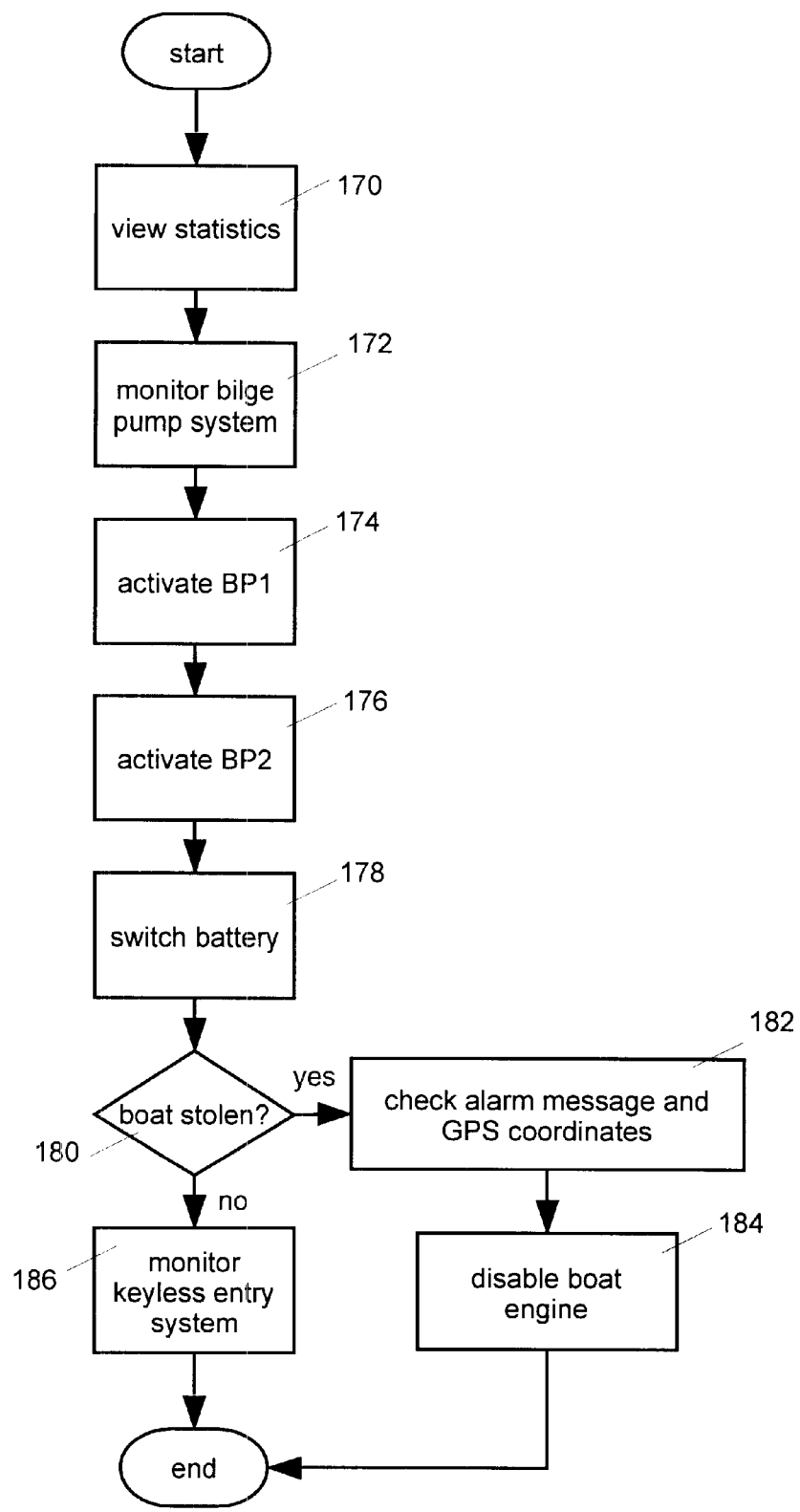
FIG. 7 is a flowchart of a general usage scenario of the remote marine monitoring system of FIG. 1.

Referring to FIG. 7, boatowner 25 can use web site 20 and all of the features of remote marine monitoring system 10 in a periodic routine to remotely monitor and control the operation of boat 26. This routine assumes that there are two bilge pumps on boat 26 and at least two batteries. This routine begins at step 170 where boatowner 25 requests statistics about boat 26 and views these statistics. Next at step 172, boatowner 25 monitors the bilge pump system. Boatowner 25 can then activate BP1 at step 174 and BP2 at step 176 as part of a maintenance procedure to make sure they are both capable of operating. Next at step 178, boatowner 25 can switch to a different battery if the current battery in use has a low voltage level.

At step 180, boatowner 25 can make sure that boat 26 is not stolen. If boat 26 is stolen then at step 182, boatowner 25 can view the alarm message and the GPS coordinates of boat 26. Boatowner 25 can then disable the engine of boat 26 at step 184 at which point the Coast Guard can be notified and boatowner 25 can stop monitoring the boat. If the boat was not stolen then at step 186, boatowner 25 may monitor the keyless entry system to determine which keytag(s) 14 were used to access boat 26, when these keytag(s) were used to access boat 26 and for how long keytags 14 were used to access boat 26.

Accordingly, the present invention makes a significant contribution to the art by allowing a boatowner to remotely monitor boat statistics, remotely monitor the bilge system, remotely activate the bilge pumps or switch to a different battery source, remotely turn on the GPS unit and ask for GPS data and remotely disable the boat engine. Information from intrusion sensors, the GPS unit and keyless entry receivers provide unique security information and act as a deterrent against would-be thieves. Furthermore, remote marine monitoring system 10 can determine normal operating conditions and detect and analyze current activity in a way that provides preventative monitoring of potentially hazardous conditions on the unattended boat. In addition, this monitoring procedure is adaptable to different environmental conditions. The present invention also uses wireless mobile communications technology and the Internet for economical transmission of statistical data and execution of remote commands. In addition, remote marine monitoring system 10 operates for a significant period of time without the need for an AC power outlet or the boat's primary battery.

Although the present invention has been discussed in association with boat 26, it should be understood that any kind of marine vessel could be fashioned with control unit 12 and accordingly, could be monitored with remote marine monitoring system 10. In addition, other types of vehicles may be monitored such as RVs, recreational homes and airplanes.

As will be apparent to persons skilled in the art, various modifications and adaptations of the structure described above are possible without departure from the present invention, the scope of which is defined in the appended claims.

We claim:

1. A method for monitoring and controlling the operation of a boat having a bilge pump over a communication network, said method comprising the steps of:
   (a) monitoring the operation of the bilge pump and detecting a warning condition for the bilge pump on the boat;
   (b) transmitting the warning condition to the user over the communication network;
   (c) receiving the warning condition over the communication network and transmitting a user response in response for controlling the physical operation of the bilge pump; and
   (d) affecting the physical operation of at least one of the bilge pump on the boat according to the user command.

2. The method of claim 1, wherein steps (a) and (b) comprise detecting the open circuit condition of the bilge pump protector circuit, determining whether the bilge pump protector circuit is open and if the determination is true, transmitting a bilge pump warning condition.

3. The method of claim 2, wherein the bilge pump protection circuit is a fuse.

4. The method of claim 2, wherein the bilge pump protection circuit is a circuit breaker.

5. The method of claim 1, wherein steps (a) and (b) comprise detecting the water level in a bilge, determining whether the bilge water level exceeds a high water level threshold, and if the determination is true, transmitting a high water warning condition.

6. The method of claim 1, wherein steps (a) and (b) comprise detecting the activity of a bilge pump, determining whether the bilge pump activity is abnormal, and if the determination is true, transmitting a bilge pump warning condition.

7. The method of claim 6, wherein the activity of the bilge pump is determined to be abnormal if the duration of time that the bilge pump is on is less than a first predetermined duration of time, or greater than a second predetermined duration of time.

8. The method of claim 7, wherein the first and second predetermined durations of time are multiples of a running average of past instances of durations of time for which the bilge pump has been on.

9. The method of claim 7, wherein the user command includes instructions to alter said first and second predetermined durations of time.

10. The method of claim 6, wherein the activity of the bilge pump is determined to be abnormal if the number of times that the bilge pump moves from an off state to an on state is a predetermined period of time is less than first predetermined number of times, or greater than a second predetermined number of times.

11. The method of claim 10, wherein the first and second durations of time are multiples of a running average of the number of times that the bilge pump has moved from an off state to an on state for the predetermined period of time.

12. The method of claim 10, wherein the user command includes instructions to alter said first and second predetermined number of times.

13. The method of claim 1, wherein the user command is to turn on a bilge pump associated with the boat.

14. The method of claim 1, wherein the communication network is selected from the group consisting of: the Internet, the wireless telephone network, and the telephone network.

15. The method of claim 1, wherein said warning condition is received over the communication network by a device selected from the group consisting of: a personal digital assistant, a computer, a pager, a telephone and a facsimile machine.

16. The method of claim 1, wherein said warning condition is transmitted over the communication network and displayed on a web site.

17. A system for monitoring and controlling the operation of a boat having a bilge pump, said system comprising:

(a) a communications network;

(b) a detector coupled to the boat for monitoring the operation of the bilge pump and detecting a warning condition associated with the bilge pump;

(c) a first transceiver coupled to the detector and to the communication network for transmitting the warning condition over the communication network;

(d) a second transceiver coupled to the communication network for receiving the warning condition from the first transceiver and for transmitting a user command to the first transceiver for controlling the physical operation of the bilge pump; and (e) a relay module coupled to the first transceiver and to the boat for affecting the physical operation of the bilge pump [boat] in accordance with the user command.

18. The system of claim 17, wherein the detector comprises a sensor selected from the group of: a high bilge water level detector, an abnormal bilge pump activity detector. a bilge pump fuse integrity detector, and a bilge pump circuit breaker detector.

19. The system of claim 17, wherein the user command is a command to turn on a bilge pump associated with the boat.

20. The system of claim 17, wherein the second transceiver is associated with at least one of a computer, a personal computing device, a pager, a facsimile machine, and a telephone.

21. The system of claim 17, wherein said first and second transceiver provides a voice and data communication link over the communication network.

* * * * *